United States Patent
Na et al.

(10) Patent No.: US 7,162,145 B2
(45) Date of Patent: Jan. 9, 2007

(54) MULTIMEDIA SYSTEM FOR TRANSFERRING AND RECEIVING PROGRAM NUMBER AND METHODS THEREFOR

(75) Inventors: Il-ju Na, Suwon (KR); Jeong-tae Kim, Suwon (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 154 days.

(21) Appl. No.: 08/939,442

(22) Filed: Sep. 29, 1997

(65) Prior Publication Data

US 2001/0028780 A1   Oct. 11, 2001

(30) Foreign Application Priority Data

Apr. 14, 1997   (KR) ................... 97-13586

(51) Int. Cl.
*H04N 5/91* (2006.01)

(52) U.S. Cl. ........................ 386/83; 386/125

(58) Field of Classification Search ............ 386/1, 386/39, 35, 45–46, 98, 83, 125–126, 4, 38, 386/52, 53, 64, 95, 117; 348/7, 12, 423.1, 348/75, 69, 83, 552, 726, 14.01, 14, 229.1, 348/231, 220.1, 221, 221.1, 223.1; 725/39, 725/49

See application file for complete search history.

(56) References Cited

U.S. PATENT DOCUMENTS

| | | | | |
|---|---|---|---|---|
| 5,488,409 A | * | 1/1996 | Yuen et al. | 386/83 |
| 5,657,414 A | * | 8/1997 | Lett et al. | 386/83 |
| 5,742,730 A | * | 4/1998 | Couts et al. | 386/69 |
| 5,787,259 A | * | 7/1998 | Haroun et al. | 348/552 |
| 5,838,876 A | * | 11/1998 | Iwamura | 386/125 |
| 5,899,578 A | * | 5/1999 | Yanagihara et al. | 386/75 |
| 5,909,257 A | * | 6/1999 | Ohishi et al. | 348/726 |
| 5,940,600 A | * | 8/1999 | Staats et al. | 710/107 |
| 5,966,385 A | * | 10/1999 | Fujii et al. | 348/423.1 |
| 6,038,368 A | * | 3/2000 | Boetje et al. | 386/52 |
| 6,097,878 A | * | 8/2000 | Saib | 386/83 |
| 6,305,018 B1 | * | 10/2001 | Usui et al. | 725/39 |
| 6,430,359 B1 | * | 8/2002 | Yuen et al. | 386/83 |

FOREIGN PATENT DOCUMENTS

EP   0 582 343 A   2/1994

(Continued)

OTHER PUBLICATIONS

Adam J. Kunzman et al., "1394 High Performance Serial Bus: The Digital Interface for ATV", IEEE Transactions on Consumer Electronics, vol. 41, No. 3, Aug. 1995, pp. 893-900.

(Continued)

*Primary Examiner*—James J. Groody
*Assistant Examiner*—Christopher Onuaku
(74) *Attorney, Agent, or Firm*—Sughrue Mion, PLLC

(57) ABSTRACT

In a multi-media system for transferring and receiving a transport stream (MPEG2-TS) between a receiver and a recording/reproducing device using the IEEE 1394 interface, a program number command of a selected program is transferred from the receiver to the recording/reproducing device during a recording/playback mode, and the recording and playback are controlled by only one input device for the receiver. Therefore, other devices of the multi-media system can be controlled without extra hardware added to the receiver. Further, an on-screen graphic (OSG) is provided by the receiver, resulting in a consistent OSG.

38 Claims, 7 Drawing Sheets

FOREIGN PATENT DOCUMENTS

| | | | |
|---|---|---|---|
| EP | 0 701 367 | A | 3/1996 |
| EP | 0 726 574 | A | 8/1996 |
| EP | 0 735 776 | A2 | 10/1996 |
| EP | 0 749 244 | A | 12/1996 |
| EP | 0 783 332 | A | 7/1997 |
| EP | 0 784 401 | A | 7/1997 |
| EP | 0 749 244 | A2 | 12/1999 |

OTHER PUBLICATIONS

Bloks, R.H.J., "The IEEE-1394 high speed serial bus" Philips Journal of Research, Elsevier, Amsterdam, NL, vol. 50, No. 1, 1996, pp. 209-216, XP004008212.

Kunzman, A. et al., "1394 High Performance Serial Bus: The Digital Interface for ATV", IEEE Transactions on Consumer Electronics, vol. 41, No. 3, Aug. 1995, pp. 893-900, XP000539552.

* cited by examiner

FIG. 4A

| Control Command/Support Inquiry Command | | | | Response | |
|---|---|---|---|---|---|
| OPC | OPRs | | Level | OPC | OPRs |
| Notify | C7 | Single Program Number | 00 | R | (Same as command) |
| | | Multi Program Number | 10 | O | |
| | | ⋮ | ⋮ | ⋮ | |

FIG. 4B

| OPR1 | Attribute |
|---|---|
| 00 | Single Program Number |
| 10 | Multiple Program Number |

FIG. 4C

| OPR | Description | Code |
|---|---|---|
| OPR1 | Single Program Number | 00 |
| OPR2 | Program Number Upper Byte | XX |
| OPR3 | Program Number Lower Byte | XX |

FIG. 4D

Multiple

| OPR | Description | Code |
|---|---|---|
| OPR1 | Multi Program Number | 10 |
| OPR2 | Program Number Count | XX |
| OPR3 | Program Number 1 Upper Byte | XX |
| OPR4 | Program Number 1 Lower Byte | XX |
| OPR5 | Program Number 2 Upper Byte | XX |
| OPR6 | Program Number 2 Lower Byte | XX |
| ⋮ | ⋮ | ⋮ |

| Status Inquiry Command | | | | Response | | | |
|---|---|---|---|---|---|---|---|
| OPC | OPRs | | Level | OPC | OPRs | | |
| Query | C8 | Single Program Number | 00 | R | Query | C8 | Single Program Number | 00 |
| | | Multi Program Number | 10 | O | | | Multi Program Number | 10 |
| | | ⋮ | | | | | ⋮ | |

FIG. 7A

| Value | Command type |
|---|---|
| 0 | CONTROL |
| 1 | STATUS |
| 2 | INQUIRY |
| 3 | NOTIFY |
| 4-7 | Reserved for future specification |
| 8-$F_{16}$ | Reserved for response codes |

FIG. 7B

| Value | Response |
|---|---|
| 0-7 | Reserved for command types |
| 8 | NOT IMPLEMENTED |
| 9 | ACCEPTED |
| $A_{16}$ | REJECTE |
| $B_{16}$ | IN TRANSITION |
| $C_{16}$ | IMPLEMENTED/STABLE |
| $D_{16}$ | CHANGED |
| $E_{16}$ | Reserved for future specification |
| $F_{16}$ | INTERIM |

FIG. 7C

| Value | Subunit type |
|---|---|
| 0 | Video monitor |
| 1-3 | Reserved for future specification |
| 4 | Video cassette recorder (VCR) |
| 5 | TV tuner |
| 6 | Reserved for future specification |
| 7 | Video camera |
| 8-$1E_{16}$ | Reserved for future specification |
| $1F_{16}$ | Extended subunit |

MULTIMEDIA SYSTEM FOR TRANSFERRING AND RECEIVING PROGRAM NUMBER AND METHODS THEREFOR

BACKGROUND OF THE INVENTION

The present invention relates to a digital audio/video (A/V) apparatus, and more particularly, to a multi-media system in which a plurality of digital A/V devices are connected each other via a digital interface.

In a digital A/V apparatus, a device can be controlled by other devices, which could not be achieved in a conventional analog A/V apparatus. As an example, the High-Definition-Digital Video Cassette Recorder (HD-DVCR) Conference defines a command set which is called AV/C CTS (Audio/Video Control Command and Transaction Set) so that an operation command from a remote controller is transferred to a target control device (called "local device") via the IEEE 1394 serial bus. Here, the IEEE 1394 serial bus is a standard related to the high-speed data transfer, which is defined by the Institute of Electrical & Electronics Engineers (IEEE). The IEEE 1394 serial bus is used as an interface for connecting each device of a digital multi-media system, having an isochronous transfer mode and an asynchronous transfer mode. Here, A/V data is transferred in real time using the isochronous transfer mode, and transactions required for communication, including read, write and lock, are transferred in an asynchronous pattern using the asynchronous transfer mode. Also, control commands such as AV/C CTS are transferred in an asynchronous pattern using the asynchronous transfer mode.

However, the contents defined by AV/C CTS include commands relating to a direct/indirect user's input button, but commands relating to all operations are not completed yet, and are still being updated. Furthermore, commands related to the transfer of information which is not noticed by a user, or the notice of which is not necessary, are not yet provided. Thus, it is difficult to achieve a single common remote control for all devices.

On the other hand, according to the articles entitled "*Specification of Consumer-Use Digital VCRs using 6.3 mm magnetic tapes-Part 8: ATV Specifications of Consumer-Use Digital VCR*" and "*Specification of Digital Interface for Consumer Electronic Audio/Video Equipment-Parts 1 & 4*", which are published by the HD-DVCR Conference, it is prescribed that an advanced television (ATV) signal having MPEG2-TS (Moving Picture Experts Group 2-Transport Stream) which is transferred using the IEEE 1394 can be recorded by an HD-VCR using 6.3 mm magnetic tape. In particular, it is prescribed to transfer the MPEG2-TS using the isochronous transfer mode of the IEEE 1394 while having a common format, i.e., common isochronous packet (CIP) header structure as in the case of a digital video cassette (DVC) called a camcoder. Here, the AV/C CTS is adopted as a control command. Also, the MPEG2 is roughly classified into one of three: MPEG2-system, MPEG2-video and MPEG2-audio. A transport stream (TS) and a program stream (PS) are defined as a transfer standard in the MPEG2-system.

FIG. 1 shows a typical example of data transfer between the ATV and HD-VCR. According to the definition by [1] "Blue Book", published by the HD-DVCR Conference, including articles entitled "*Specification of Consumer-Use Digital VCRs using 6.3 mm magnetic tapes*", "*Specification of Digital Interface for Consumer Electronic Audio/Video Equipment*", and "*Specifications of A/C Command and Transaction Set for Digital Interface*", A/V data transferred from an ATV 10 to HD-VCR 20 which are connected by an IEEE 1394 cable 30 during a recording mode, is a multi-program MPEG2-TS, and data transferred from the HD-VCR 20 to the ATV 10 during a playback mode is a single program MPEG2-TS. Here, the term ATV refers to the American high definition television (HDTV) suggested by the Advanced Television Systems Committee (ATSC). Also, the AV/C CTS suggested in the Blue Book defines control commands with respect to VCR sub-devices, most of which relate to mechanical operation.

For example, commands from a remote controller 11 for the ATV 10, such as fast-forward and rewind, can be transferred to the HD-VCR 20 via the IEEE 1394 serial bus. However, control commands to the VCR sub-devices do not include commands for transferring information related to an MPEG2 system layer, e.g., program number.

Thus, the MPEG2-TS is transferred from the ATV 10 to the HD-VCR 20 during the recording mode. Here, the HD-VCR 20 should receive information required for parsing the MPEG2-TS being transferred from the ATV 10, from a user using a remote controller 21 for HD-VCR 20.

Also, the recorded single program MPEG2-TS is transferred from the HD-VCR 20 to the ATV 10 during the playback mode. Here, a program number recorded in a video auxiliary (VAUX) region should be transferred from the HD-VCR 20 to the ATV. Additionally, it is prescribed in the Blue Book to record the program number in the VAUX region of a tape.

However, the multi-media system of FIG. 1 requires a separate remote controller for each device connected to the ATV. That is, when a plurality of devices, being capable of recording/reproducing a received signal, are connected to the ATV, there is an inconvenience in that an operational command should be input to each recording/reproducing device by the user, using a different remote controller for each device.

Also, when selecting a program by parsing a program guide information (PG) for the MPEG2-TS in the multi-media system shown in FIG. 1, the HD-VCR 20 should first parse the program guide information in the multi-program MPEG2-TS transferred from the ATV. In order to display the parsed program guide information on an on-screen graphic (OSG) display, the OSG of the program guide information is transferred to the ATV 10 by being MPEG2-TS encoded since there is no OSG transfer standard in the IEEE 1394. Then, a user can input a program number corresponding to an intended program, using an up/down key of the remote controller 21 for the HD-VCR while viewing the OSG displayed on the ATV 10. Thus, this multi-media system requires an extra encoding circuit in the HD-VCR 20, for the MPEG2-TS encoding of the OSG, and the ability to parse the program guide information from MPEG2-TS in order to constitute the OSG. Also, the generation of the OSG is dependent on the VCR manufacturer, so it is difficult to provide the same OSG consistently. Although the ATV parses the program guide information in transferred MPEG2-TS and displays the parsed program guide information on an OSG display, and a user inputs a program number using the remote controller 11 for the ATV, the program number can not be transferred to the HD-VCR 20, since no command is defined for transferring the program number to the HD-VCR 20.

SUMMARY OF THE INVENTION

To solve the above problems, it is an object of the present invention to provide a multi-media system for transferring a program number between a plurality of digital A/V devices having a digital interface, in an asynchronous transfer mode, where the multi-media system is universally controlled by a single remote controller.

It is another object of the present invention to provide a multi-media system for receiving a program number between a plurality of digital A/V devices having a digital interface, in an asynchronous transfer mode.

It is still another object of the present invention to provide a multi-media system in which a receiver, for receiving an MPEG2-TS, parses program guide information of the MPEG2-TS, displays the parsed information on an on-screen graphic (OSG) display, and then transfers a command with respect to the input program number to a recording/reproducing device.

It is still yet another object of the present invention to provide a method for transferring a program number during a recording mode, using an asynchronous transfer mode, in the MPEG2-TS transfer between a plurality of digital A/V apparatuses having a digital interface.

It is further object of the present invention to provide a method for receiving a program number during a playback mode, using an asynchronous transfer mode, in the MPEG2-TS transfer between a plurality of digital A/V apparatuses having a digital interface.

To achieve the above objects, there is provided a multi-media system comprising an input device for inputting one or more program numbers of intended programs; a receiver having a first digital interface, for making the program number into a command, and for transferring the command in an asynchronous transfer mode via the first digital interface; and a recording/reproducing device having a second digital interface, for decoding the command transferred from the receiver, and for recording/reproducing a transport stream being received, corresponding to the program number obtained by decoding the received command.

Here, the receiver may include an OSG generator for generating the program guide information of the received transport stream on the OSG display.

Further, there is provided a method for transferring and receiving a program number between a receiver with a digital interface for receiving a transport stream and a recording/reproducing device with a digital interface for recording/reproducing the transport stream on/from a recording medium, the method comprising the steps of: (a) providing a program number of an intended program to be recorded; and (b) making into a command corresponding to the program number input so as to transfer the program number command, from the receiver to the recording/reproducing device. Here, the method may further comprises the steps of: (c) transferring a command for inquiring as to whether to permit the transfer of the program number of the program recorded in the recording medium, from the receiver to the recording/reproducing device, during a playback mode; and (d) receiving the program number of the program recorded in the recording medium, from the recording/reproducing device.

BRIEF DESCRIPTION OF THE DRAWINGS

The above objects and advantages of the present invention will become more apparent by describing in detail a preferred embodiment thereof with reference to the attached drawings in which:

FIGS. 4A through 4D show formats of an MPEG2 information notify command for transferring a program number, according to the present invention;

FIGS. 7A through 7C are tables respectively defining a command type, a response code and a subunit address according to the AV/C CTS specification, for constituting the command frame and the response frame shown in FIG. 6;

DETAILED DESCRIPTION OF THE INVENTION

For convenience of explanation, an advanced television (ATV) will be described as an example of an MPEG2-TS broadcasting signal receiver, and a high definition videocassette recorder (HD-VCR) will be described as an example of an MPEG2-TS recording/reproducing device. However, any apparatus having a digital interface capable of transferring/receiving an MPEG2-TS, can replace the ATV, and any MPEG-2-TS recording/reproducing device can replace the HD-VCR, for the purposes described below.

Figure 1:
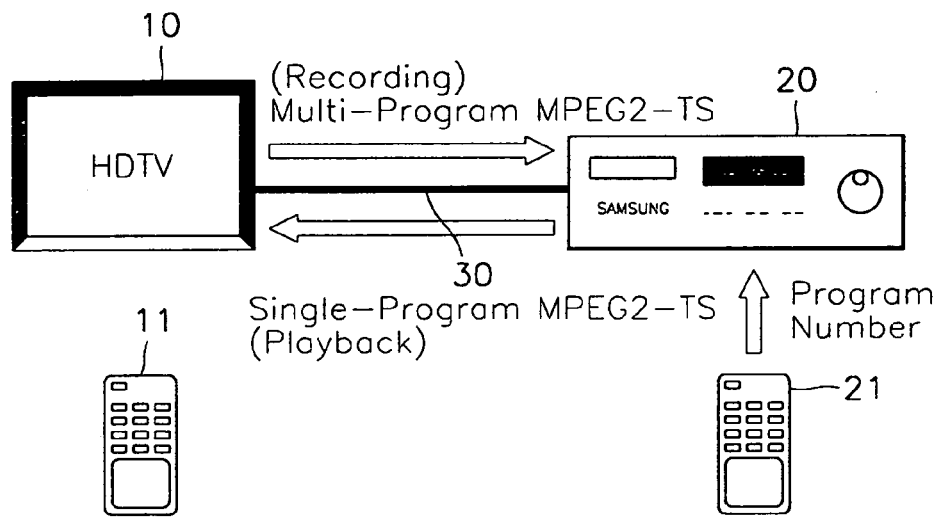
FIG. 1 is a diagram illustrating a conventional method for MPEG2-TS transfer between an ATV and an HD-VCR.
Figure 2:
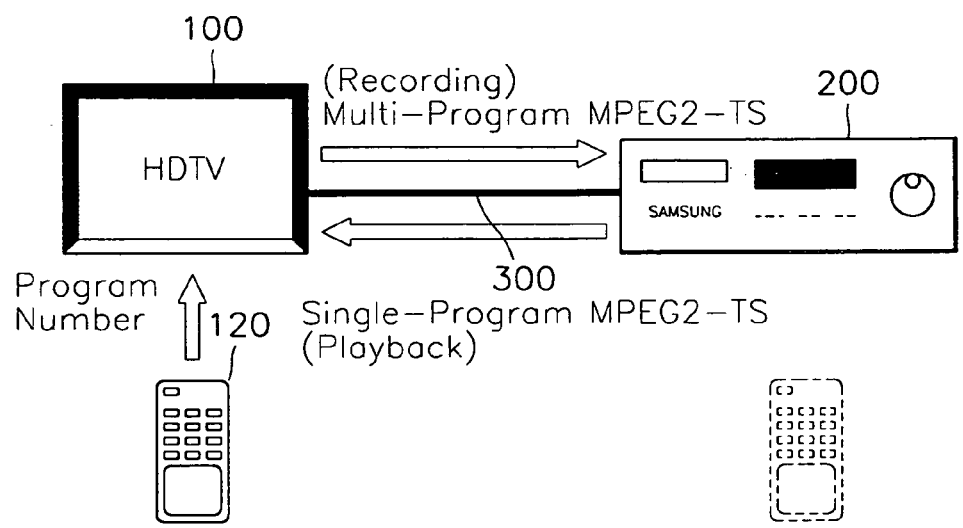
FIG. 2 is a diagram illustrating a method for MPEG2-TS transfer between an ATV and an HD-VCR according to the present invention.

Furthermore, in order to simplify the structure of the multi-media system shown in FIG. 2, only an HD-VCR 200 and an ATV 100 are connected by an IEEE 1394 cable 300. However, other digital audio/video devices may be connected to the ATV 100 and/or the HD-VCR 200 by the IEEE 1394 cable 300. In the multi-media system of FIG. 2, one remote controller 120 for the ATV (ATV-remote controller) is used. During a recording mode, a multi-program MPEG2-TS is transferred from the ATV 100 to the HD-VCR 200. During a playback mode, a single program MPEG2-TS is transferred from the HD-VCR 200 to the ATV 100.

However, a single program MPEG2-TS may be transferred from the ATV 100 to the HD-VCR 200 during the recording mode, and from the HD-VCR 200 to the ATV 100 during the playback mode. Also, a multi-program MPEG2-TS may be transferred from the ATV 100 to the HD-VCR 200 during the recording mode, and from the HD-VCR 200 to the ATV 100 during the playback mode.

According to the present invention, one or more program numbers provided by the ATV-remote controller 120 are transferred as a command during the IEEE 1394 asynchronous transfer mode, and the program number recorded on a tape is transferred from the HD-VCR 200 to the ATV 100 during the playback of the MPEG2-TS, such that the HD-VCR 200 is controlled by the ATV 100. To achieve this, a new command for transferring a program number should be added to the AV/C CTS, and the new command is transferred from the ATV 100 and the HD-VCR 200 using the asynchronous transfer mode of the IEEE 1394.

Figure 3:
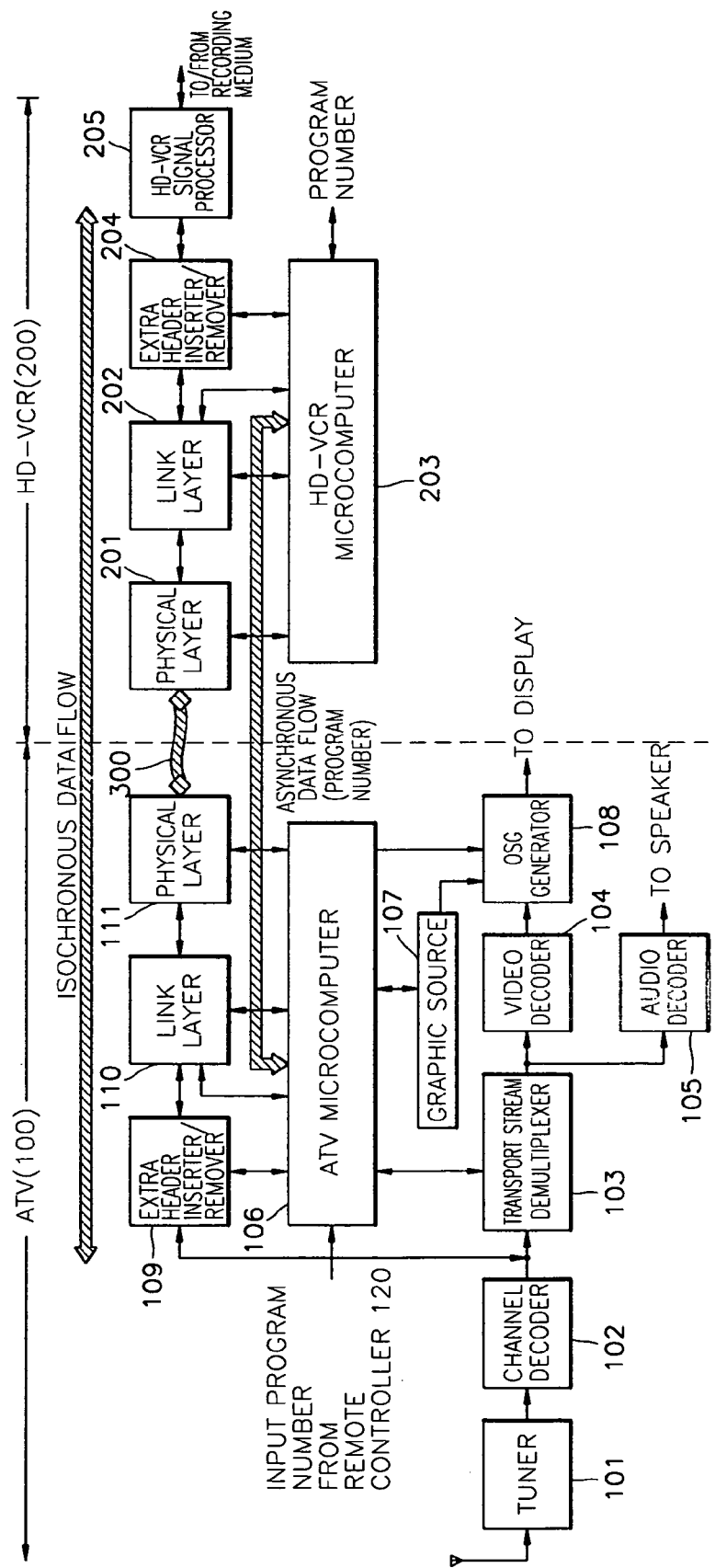
FIG. 3 is a block diagram of a multi-media system for transferring and receiving a program number, according to a preferred embodiment of the present invention.

FIG. 3 is a block diagram of a multi-media system for transferring a program number between the ATV 100 and the HD-VCR 200. In FIG. 3, a tuner 101 selects the frequency band of an intended program from the multi-program MPEG2-TS received via an antenna. A channel decoder 102 extracts the intended multi-program MPEG2-TS after removing an error correction code from the received signal. The multi-program MPEG2-TS extracted from the channel decoder 102 is provided to a transport stream demultiplexer 103 during a display mode, and to an extra header inserter/remover 109 during a transfer mode. Here, the MPEG2-TS corresponds to an MPEG2-system layer.

Here, the MPEG2 system layer will be described briefly for easy understanding of the present invention. One program consists of video information, audio information and user data information. According to the MPEG2-TS defined by the MPEG2 system layer, video data information, audio data information and user data information corresponding to a plurality of programs are time-division multiplexed into one stream. The MPEG2-TS includes program specific information (PSI) such that a receiver can properly parse the audio data information, video data information and user data information corresponding to an intended program during demultiplexing.

Most of the PSI is in table form, such as the program association table (PAT), program map table (PMT) and conditional access table (CAT). Here, the PAT and PMT are important. One PMT exists per program. In the PMT, packet identification numbers (PIDs) with respect to transport stream packets including a video stream and an audio stream of the corresponding program, are summarized by item. Here, the video stream of the program is represented by PID=XXXX, and the audio stream thereof is represented by PID=YYYY. The lengths of the transport stream packets are fixed at 188 bytes.

Since a plurality of programs exist in one transport stream (TS), a plurality of PMTs exist in the TS. Thus, a synthetic table is required, for connecting each program of the TS with the PMT PIDs of each program. This synthetic table is called the "PAT". Since one program is expressed as one program number, items of the PAT are constituted of information giving the relationship between the program number (=XXXX) and the PMT PID.

On the other hand, a transport stream demultiplexer 103 parses the PAT and PMT of the multi-program MPEG2-TS of a channel selected by the channel decoder 102. The transport stream demultiplexer 103 then extracts a video PID (V_PID) and an audio PID (A_PID) from the parsed PMT, to separate a video stream and an audio stream according to the video PID and the audio PID. The video and audio streams are provided to a video decoder 104 and an audio decoder 105, respectively. Further, the transport stream demultiplexer 103 parses program guide information of the multi-program MPEG2-TS of the channel selected by the channel decoder 102, and provides the parsed information to an ATV microcomputer 106.

The video decoder 104 decodes the separated video stream and displays the decoded image signal on a display (not shown). The audio decoder 105 decodes the audio stream and provides the decoded sound signal to a sound output device (not shown) such as a speaker.

An on-screen graphic (OSG) generator 108 mixes the program guide information with a graphic signal used as a background screen, generated by a graphic source 107, or with the image signal decoded by the video decoder 104, under the control of the ATV microcomputer 106, to display the result on a display (not shown). Here, a user inputs one or a plurality of program numbers of intended programs using the ATV-remote controller 120. The OSG is reproduced by the ATV 100, and the same OSG is provided, regardless of the manufacturers of the connected apparatus. Also, it is unnecessary for an HD-VCR signal processor 205 of the HD-VCR 200 to parse the program guide information existing in MPEG2-TS.

Here, the transport stream demultiplexer 103, the video decoder 104, the audio decoder 105, the graphic source 107 and the OSG generator 108 may be called an "ATV signal processor." Also, an on-screen display (OSD) generator for generating the program guide information for an OSD may be included instead of the OSG generator 108.

On the other hand, a transaction layer, an IEEE 1394 serial bus management layer, a link layer 110 and a physical layer 111, which are various layer of the IEEE 1394 protocol, may be called as a digital interface for the ATV. Here, the transaction layer and the IEEE 1394 serial bus management layer are installed in the ATV microcomputer 106 as software.

The HD-VCR 200 comprises a digital interface including a physical layer 201, a link layer 202, a transaction layer and an IEEE 1394 serial bus management layer, an HD-VCR microcomputer 203, an extra header inserter/remover 204 and an HD-VCR signal processor 205. Here, the transaction layer and the IEEE 1394 serial bus management layer are installed in the HD-VCR microcomputer 103 as software.

Next, the MPEG2-TS transfer during the isochronous transfer mode, and the transfer and reception of the program number during the asynchronous transfer mode, via the IEEE 1394 serial bus, will be described.

(I) MPEG2-TS Transfer

The transfer of the MPEG2-TS from the ATV 100 to the HD-VCR 200 during the recording mode will be described as an example. During the playback mode, the transfer of the MPEG2 is performed reversed. In order to transfer the 188-byte multi-program MPEG2-TS packets output from the channel decoder 102 via the IEEE 1394 interface, the extra header inserter/remover 109 inserts a time stamp, divides each TS packet having the time stamp into block units of a predetermined size (24 bytes), and adds a CIP header to each block, thereby constituting a data block packet for the IEEE 1394 transfer. The link layer 110 adds an isochronous header to the data block packet including the CIP header for the IEEE 1394 transfer, output from the extra header inserter/remover 109 to make the data block packet into an isochronous packet. The link layer 110 then converts the isochronous packet into a serial signal. The physical layer 111 converts the serial signal into an electrical signal.

The electrical signal is input to the physical layer 201 of the digital interface of the HD-VCR, via the IEEE 1394 cable 300. The physical layer 201 converts the electrical signal into digital data. The link layer 202 converts the digital data into parallel data of a 1-byte unit and then removes the isochronous header. The extra header inserter/remover 204 removes the extra header (CIP header), and makes the data into a TS packet to be provided to the HD-VCR signal processor 205. For selecting a single program, the HD-VCR signal processor 205 parses the PAT from the multi-program MPEG2-TS processed into transport packets, and parses the PMT PID based on the parsed PAT using the asynchronously transferred program number. That is, since the PAT PID is set to "0", the PAT is extracted by checking whether the PAT PID is equal to "0" or not. Also, all packets of an intended program are extracted by extracting the A_PID and the V_PID from the PMT PID to be recorded on a tape. Here, the HD-VCR signal processor 205 performs signal processing for reproduction as well.

For the above operation by the HD-VCR signal processor 205, the program information (program number) selected by a user must be transferred from the ATV-remote controller 120 to the ATV-microprocessor 106, and then to the HD-VCR 200. Since the program number is transferred once after the recording mode is set, the program number is transferred as an asynchronous packet together with a recording start command. According to the current specification proposed by the HD-VCR Conference, a command capable of transferring a program number is not defined. Thus, the present invention is intended to transfer the program number by adding a command for transferring the program number thereto. Also, the program specific information (PSI) excluding the program number, e.g., PMT PID, V_PID, A_PID and other information, can be transferred. This command is required for controlling the A/V apparatus as well as the AV/C CTS.

The addition of the program number transferring command is meaningful more than decreasing the number of remote controllers for each apparatus in the multi-media system. That is, even though it is not shown in the embodiment of the present invention, it means that the HD-VCR 200 can connect to various types of external apparatuses or a network. That is, the HD-VCR 200 can accept a program number input from an external network such as the Internet, as it does a program number transferred from the ATV 100, so that the control by the network is possible. For example, suppose that the Internet includes a home page providing program guide information managed by a broadcasting station, and an ATV capable of web browsing exists at home. If a user selects a program by connecting to the home page, the corresponding program number would be transferred to the ATV of the user and then to the HD-VCR.

(II) Transfer and Reception of Program Number

A command for transferring a program number, proposed by the present invention, is transferred as an asynchronous packet using the asynchronous transfer mode. Here, the flow of the asynchronous transfer relates to a microcomputer.

The command for transferring a program number is implemented using the IEEE 1394 read and write transactions, wherein the write and read transactions are performed in a transaction layer which is implemented by software in the ATV microcomputer 106. The ATV microcomputer 106 also implements the contents related to the management of a serial bus and an application program, as well as the transaction layer, by software.

The link layer 110 adds an asynchronous header to a program number command in order to transfer the program number command as an asynchronous packet from the ATV microcomputer 106 according to the AV/C CTS specification, and converts the command having the asynchronous header into serial data. The physical layer 111 converts the serial data into an electrical signal to be provided via the IEEE 1394 cable 300.

The physical layer 201 as an HD-VCR digital interface converts the electrical signal into digital data. The link layer 202 converts the digital data into parallel data of a 1-byte unit, removes the asynchronous header, and then outputs the result to the HD-VCR microcomputer 203. The HD-VCR microcomputer 203 recognizes the program number command and writes the program number in a VAUX region of the tape during a recording mode, and it reads out the program number recorded in the VAUX region during a playback mode to transfer the program number to the ATV 100 via the digital interface of the HD-VCR.

Next, a control command for the program number generated according to the AV/C CTS specification will be described in detail. Here, the AV/C CTS specification is disclosed in the reference [2] entitled "*Specification of Digital Interface for Consumer Electronic Audio/Video Equipment*" (called IEC1883).

According to the above cited reference [2], a node on the IEEE 1394 serial bus in the AV/C CTS is called a "device". The device is divided into sub-devices. For example, a VCR device may be constituted of a VCR sub-device and a tuner sub-device. Also, devices for transferring and receiving a command are called "controller" and "target", respectively. The controller can transfer a command to the target. There are a control command, a status inquiry command, a support inquiry command and a report notify command. Also, the commands are classified as device commands or sub-device commands, according to whether the target of the command is a device unit or a sub-device unit. The target receiving the command is set to respond within a predetermined time (100 msec) after receiving a command. For a smooth transfer of commands and responses between two devices, a command register and a response register are required. The command register and the response register exist in the microcomputers 106 and 203 of FIG. 3 or an external memory (not shown), which are mapped at a predetermined location on the IEEE 1394 bus.

FIG. 4A shows the format of an MPEG2 information notify command according to the present invention, defining a command for notifying a target (HD-VCR) of information related to the MPEG2-TS. In this format, a command for inquiring of whether to supply an information transfer function or not is also defined. Generally, a VCR device performs a single program recording, however, the command format of FIG. 4A includes the commands for both single program recording and multi-program recording. In FIGS. 4A to 4D, "OPC" presents an operation code, "OPR" represents an operand, and "R" and "O" of the "level" column are abbreviations of "recommended" and "optional", respectively. Also, "XX" represents that the OPR differs according to the cases. FIGS. 4B to 4D define the OPRs of the command of FIG. 4A.

Figures 5, 6:
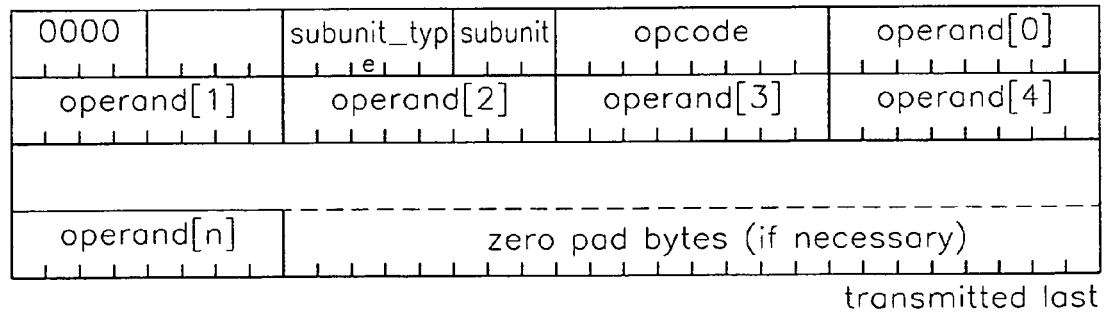
FIG. 5 shows the format of an MPEG2 information inquiry command for receiving a program number, according to the present invention.
FIG. 6 shows the format of the commands of a command frame and a response frame, according to the AV/C CTS specification, for easy understanding of the present invention.

FIG. 5 shows the format of an MPEG2 information inquiry command according to the present invention, in which a command capable of taking MPEG2-TS information from a target (HD-VCR) is defined. Here, each OPR is the same as those of the MPEG2 information notify command of FIGS. 4B to 4D.

FIG. 6 shows the format of an AV/C command frame and of an AV/C response frame proposed by the cited reference [2], and FIGS. 7A to 7C are tables defining a command type, a response code and a subunit address, respectively, proposed by the cited reference [2].

Figure 8:
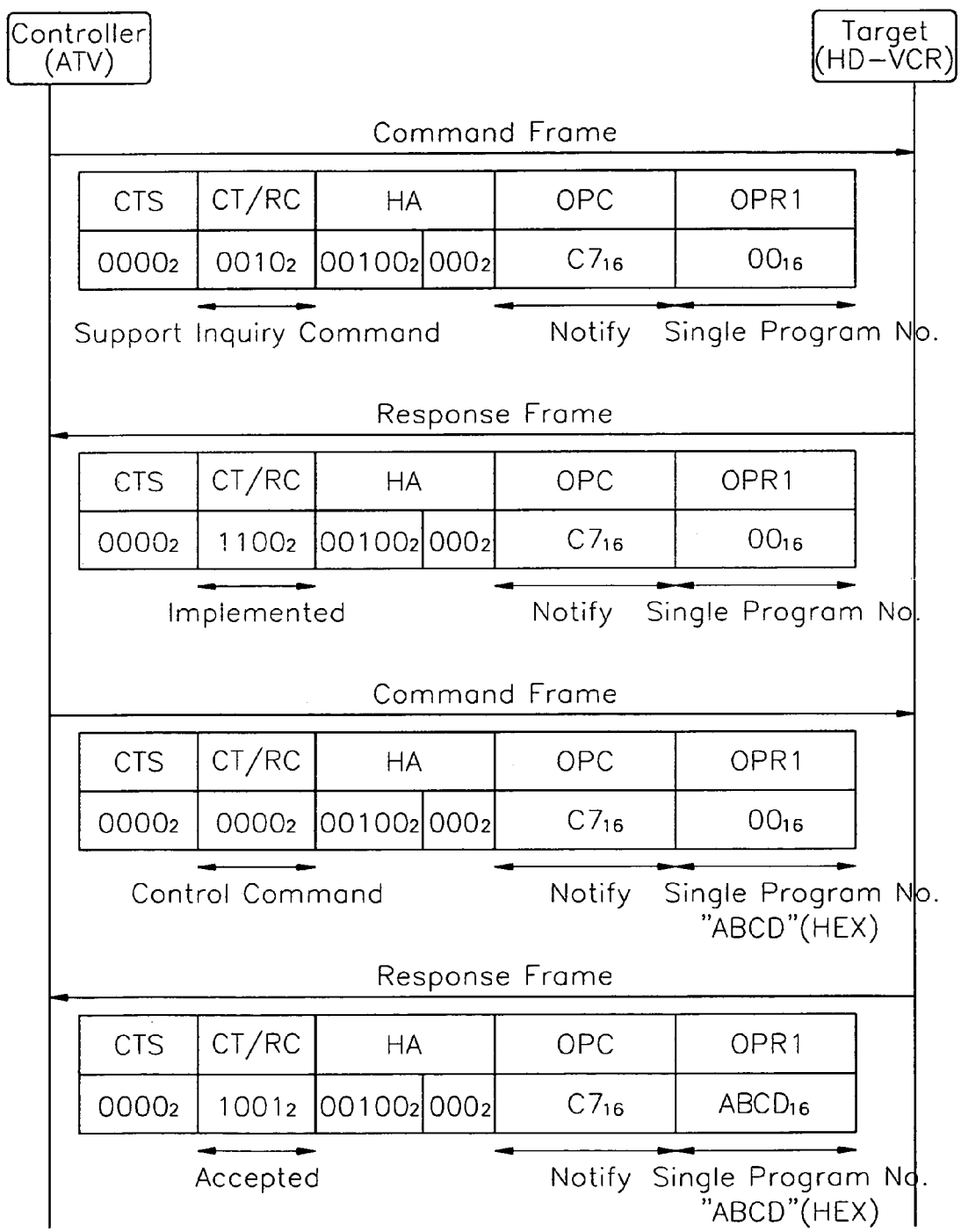
FIG. 8 is a diagram showing an example of transferring a program number of a single program during a recording mode.

FIG. 8 shows an example in which the program number of a single program is transferred from the ATV 100 to the HD-VCR 200 during a recording mode using the commands defined in FIGS. 4A through 4D, 5, 6 and 7A through 7C, which is performed by software in the ATV microcomputer 106 of FIG. 3.

In FIG. 8, when a program number is input by a user during the recording mode, a controller (ATV) transfers a first command frame to a target (HD-VCR) to inquire (OPC:C7$_{16}$) whether to support (CT/RC: 0010$_2$) the recording of the program number of a single program (OPR1:00$_{16}$) by a first VCR device (Header Address(HA):00100$_2$/000$_2$). Then, the target (HD-VCR) transfers a first response frame to the controller (ATV) as a response (OPC:C7$_{16}$) for permitting (CT/RC:1100$_2$) the recording of the program number of the single program (OPR1:00$_{16}$) by the first VCR device (HA:00100$_2$/000$_2$).

The controller (ATV) receives the first response frame, and transfers a second command frame to the target (HD-VCR) to notify (OPC:C7$_{16}$) a command (CT/RC:0000$_2$) for recording the program number (OPR1:00 ABCD$_{16}$) of the program selected by a user by using the first VCR device (HA:00100$_2$/000$_2$). Then, the target (HD-VCR) transfers a second response frame to the controller (ATV) to notify (OPC:C7$_{16}$) the permission (CT/RC:1001$_2$) of the recording of the program number (ABCD$_{16}$) by the first VCR device (HA:00100$_2$/000$_2$).

Figure 9:
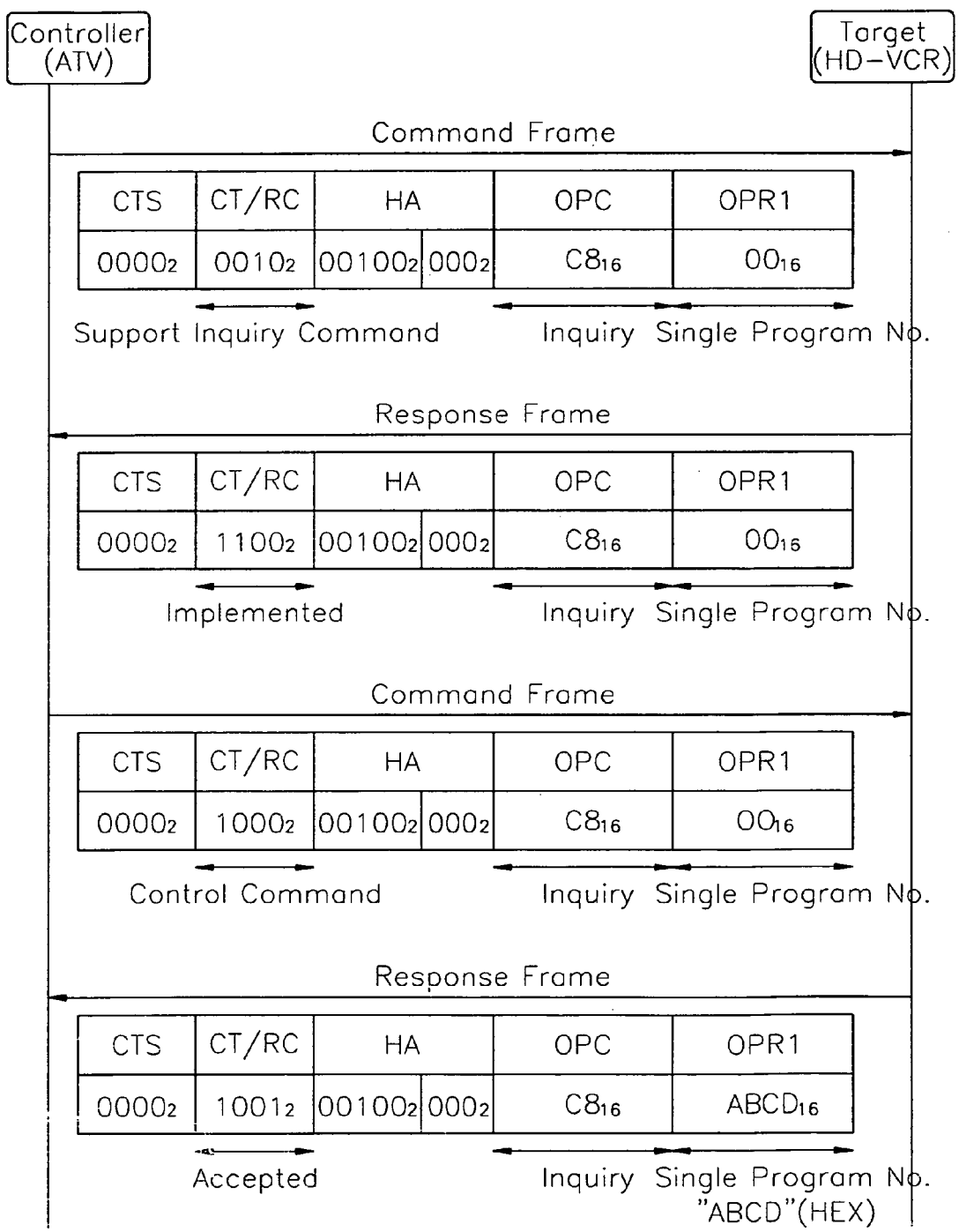
FIG. 9 is a diagram showing an example of receiving a program number of a single program during a playback mode.

FIG. 9 shows an example in which the program number of a single program is received by the ATV 100 from the HD-VCR 200 during the playback mode, which is performed by the ATV microcomputer 106.

In FIG. 9, when the playback mode is set, a controller (ATV) transfers a first command frame to a target (HD-VCR) to inquire (CT/RC:0010$_2$) as to whether to notify (OPC:C8$_{16}$) the target (HD-VCR) of the program number of a single program (OPR1:00$_{16}$) recorded by a first VCR device (HA:00100$_2$/000$_2$). Here, the target (HD-VCR) transfers a first response frame to the controller (ATV) to notify (OPC:C8$_{16}$) the controller (ATV) of the permission (CT/RC:1100$_2$) of the reproduction of the single program (OPR1:00$_{16}$) by the first VCR device (HA:00100$_2$/000$_2$).

Then, the controller (ATV) transfers a second command frame to the target (HD-VCR) to inquire (CT/RC:1000$_2$) as to whether to notify (OPC:C8$_{16}$) the target (HD-VCR) of the program number of the single program (OPR1:00$_{16}$) recorded by the first VCR device (HA:00100$_2$/000$_2$). Here, the target (HD-VCR) transfers a second response frame to the controller (ATV) to notify (CT/RC:1001$_2$) the controller (ATV) of the program number (ABCD$_{16}$) of the single program (OPR1:00$_{16}$) recorded by the first VCR device (HA:00100$_2$/000$_2$).

The remote controller of the above embodiment may include all input devices.

As described above, in the multi-media system according to the present invention, the program number is transferred and received during the asynchronous transfer mode of the IEEE 1394 digital interface, so that various digital A/V apparatuses can all be controlled by one apparatus, implementing a home network. Also, an OSG generator is provided in the ATV, providing a consistent OSG.

What is claimed is:

1. A multi-media system comprising:
a receiver for receiving a multi-program transport stream and a recording/reproducing device for recording/reproducing the multi-program transport stream, said receiver comprising:
a first signal processor for parsing program specific information (PSI) of the received multi-program transport stream and decoding a video signal and an audio signal of an intended program based on the parsed PSI;
an input device for entering program information of intended programs; and
a first digital interface for receiving program information of an intended program from said input device, generating a program information control command based on the program information of the intended program, and transmitting the multi-program transport stream provided by said first signal processor and the program information control command; and said recording/reproducing device comprising:
a second digital interface for receiving the program information control command and the multi-program transport stream from said from said first digital interface and decoding the program information control command to obtain the program information of the intended program; and
a second signal processor for extracting the intended program from the multi-program transport stream received by said second digital interface, based on the program information, and recording the extracted program on recording media during a recording mode, and generating a reproduced transport stream which is provided to the second digital interface during a playback mode.

2. The multi-media system of claim 1, wherein said input device is a remote controller.

3. The multi-media system of claim 2, wherein said receiver is connected to one or more recording/reproducing devices using the digital interface and said recording/reproducing devices are controlled by said input device.

4. The multi-media system of claim 1, wherein said first digital interface generates the program information control command based on the parsed PSI.

5. The multi-media system of claim 1, wherein said first and second digital interfaces are each an IEEE 1394 interface.

6. The multi-media system of claim 5, wherein said first digital interface transfers the transport stream as isochronous packets during an isochronous transfer mode, and transfers the program information control command as asynchronous packets during an asynchronous transfer mode using a control command set.

7. The multi-media system of claim 6, wherein the control command set is an audio/video control command and transaction set (AV/C CTS).

8. The multi-media system of claim 5, wherein said first digital interface comprises:
a first microcomputer including a transaction layer and a serial bus management layer, as software, for generating the program information control command based on the program information received from the input device, using a write transaction and a read transaction;
a first link layer for adding an asynchronous header to the program information control command received from the first microcomputer to convert the program information control command into serial data; and
a first physical layer for converting the serial data into an electrical signal.

9. The multi-media system of claim 8, wherein said receiver further comprises a first extra header inserter/remover for inserting an extra header into a transport stream being received, to form a data block packet for the IEEE 1394 transfer, and for removing the extra header inserted into a reproduced data block packet, provided by said first digital interface, for the IEEE 1394 transfer.

10. The multi-media system of claim 8, wherein said second digital interface comprises:
- a second physical layer for converting the program information control command electrical signal, transferred from said first physical layer, into digital data;
- a second link layer for converting the program information control command digital data into parallel data, and for removing an asynchronous header; and
- a second microcomputer including a transaction layer and a serial bus management layer, as software, for recording the program information on a predetermined region of a recording medium by recognizing the program information control command during a recording mode, and for reading out the program information of the intended program recorded in the predetermined region during a playback mode.

11. The multi-media system of claim 10, wherein said recording/reproducing device further comprises a second extra header inserter/remover for removing an extra header inserted into an data block packet provided by said second digital interface for a IEEE 1394 transfer, and for inserting an extra header into the transport stream reproduced from the second signal processor, to form the data block packet for the IEEE 1394 transfer.

12. The multi-media system of claim 1, wherein said first digital interface transfers a multi-program transport stream isochronous packets in an isochronous transfer mode, and said second digital interface transfers a single program transport stream as isochronous packets in the isochronous transfer mode during a playback mode.

13. The multi-media system of claim 1, wherein said first digital interface transfers a multi-program transport stream as isochronous packets in an isochronous transfer mode, and said second digital interface transfers a multi-program transport stream as isochronous packets in the isochronous transfer mode during a playback mode.

14. The multi-media system of claim 1, wherein said first digital interface transfers a single program transport stream as isochronous packets in an isochronous transfer mode, and said second digital interface transfers a single program transport stream as isochronous packets in the isochronous transfer mode during a playback mode.

15. The multi-media system of claim 1, wherein said first signal processor further comprises an on-screen graphic (OSG) generator for displaying the program guide information of a transport stream being received on an OSG display.

16. The multi-media system of claim 15, wherein said OSG generator mixes the program guide information with a graphic signal of a background screen to be provided to said OSG display.

17. The multi-media system of claim 15, wherein said OSG generator mixes the program guide information with the decoded video signal to be provided to said OSG display.

18. The multi-media system of claim 15, wherein the second signal processor does not parse the program guide information from a transport stream being received via the second digital interface.

19. The multi-media system of claim 1, wherein said first signal processor further comprises an on-screen display (OSD) generator for displaying the program guide information of a transport stream being received on an OSD display.

20. A method for transferring program information between a receiver with a digital interface for receiving a multi-program transport stream and a recording device with a digital interface for recording the multi-program transport stream on a recording medium, wherein the multi-program transport stream is transferred between the digital interface of the receiver and the digital interface of the recording device, the method comprising the steps of:
- (a) providing program information of an intended program to be recorded;
- (b) transferring a command for inquiring as to whether to permit the recording of the program;
- (c) receiving a response for permitting the recording of the program from the recording device;
- (d) transferring a command for performing the recording of the program corresponding to the program information provided in the step (a); and
- (e) receiving a response for notifying of the permission of the recording of the program corresponding to the program information, from the recording device.

21. The method of claim 20, wherein the step (a) comprises the steps of:
- (a1) parsing the program guide information from the transport stream;
- (a2) displaying the parsed program guide information; and
- (a3) providing the program information of the intended program according to the displayed program guide information.

22. The method of claim 21, wherein step (a2) comprises displaying the parsed program guide information on an OSG display.

23. The method of claim 21, wherein step (a2) comprises displaying the parsed program guide information on an OSD display.

24. The method of claim 20, wherein the digital interface of the receiver and the digital interface of the recording/reproducing device are linked by an IEEE 1394 serial bus cable.

25. A method for receiving program information by a receiver with a digital interface for receiving a multi-program transport stream and a reproducing device with a digital interface for reproducing the multi-program transport stream recorded on a recording medium, wherein the multi-program transport stream is transferred between the digital interface of the reproducing device and the digital interface of the receiver, the method comprising the steps of:
- (a) inquiring as to whether to permit the transfer of program information corresponding to the program recorded on the recording medium, during a playback mode;
- (b) receiving a response for permitting the reproduction of the program from the reproducing device;
- (c) transferring a command for requesting the program information of the program recorded on the recording medium; and
- (d) transferring a command indicating the program information of the program recorded on the recording medium from the reproducing device.

26. The method of claim 25, wherein the digital interface of the receiver and the digital interface of the recording/reproducing device are linked by an IEEE 1394 serial bus cable.

27. A digital audio/video (A/V) device having a receiver for receiving a multi-program transport stream, wherein the receiver comprises:
- an input device for inputting the program number of an intended program;
- a signal processor for parsing program specific information (PSI) of the received multi-program transport stream and decoding a video signal and an audio signal of the intended program based on the parsed PSI; and a digital interface for generating a program information control command based on program information input by a user, and transferring the multi-program transport stream output from the signal processor and the control command, wherein the receiver is connected to at least one recording/reproducing device using the digital interface and the receiver and the recording/reproducing device are controlled by the input device, and wherein the digital interface comprises:

a first microcomputer including a transaction layer and a serial bus management layer as software, for generating the program information control command based on the program information input via the input device, using a write transaction and a read transaction;

a first link layer for adding an asynchronous header to the control command generated by the first microcomputer to convert the control command into serial data; and a first physical layer for converting the control command serial data into an electrical signal.

28. The device of claim 27, wherein the receiver further comprises a first extra header inserter/remover for inserting an extra header into a transport stream being received, to constitute a data block packet for the IEEE 1394 transfer, and for removing the extra header inserted into a reproduced data block packet for the IEEE 1394 transfer, input via the digital interface.

29. A digital audio/video (A/V) recording/reproducing device for recording/reproducing a multi-program transport stream transferred from a digital A/V device, the recording/reproducing device comprising:

a digital interface for decoding a program information command transferred from the digital A/V device and for receiving the multi-program transport stream being transferred from the digital A/V device; and a signal processor for extracting an intended program from the multi-program transport stream received by the digital interface, based on the program information, and for recording the extracted result on recording media during a recording mode, and for outputting a reproduced transport stream to the digital interface during a playback mode, wherein the digital interface comprises an IEEE 1394 interface, and wherein the digital interface comprises:

a second physical layer for converting the program information command electrical signal, transferred from the first physical layer, into digital data;

a second link layer for converting the program information command digital data into parallel data, and for removing the asynchronous header; and a second microcomputer including a transaction layer and a serial bus management layer as software, for recording the program information on a predetermined region of a recording medium by recognizing the program information command during a recording mode, and for reading out the program information recorded in the predetermined region during a playback mode.

30. The device of claim 29, wherein the recording/reproducing device further comprises a second extra header inserter/remover for removing an extra header inserted into the data block packet for the IEEE 1394 transfer, being received via the digital interface, and for inserting an extra header into the transport stream reproduced from the second signal processor, to constitute the data block packet for the IEEE 1394 transfer.

31. A method for transferring program information between a receiver with a digital interface for receiving a multi-program transport stream and a recording and reproducing device with a digital interface for recording the multi-program transport stream on a recording medium, the method comprising the steps of:

(a) receiving program information of an intended program to be recorded or reproduced;

(b) transferring a command for inquiring as to whether to permit the recording or reproducing of the program;

(c) receiving a response for permitting the recording of the program from the recording and reproducing device; and (d) transferring a command for performing the recording of the program corresponding to the program information input in the step (a).

32. The method of claim 31, further comprising the step of (e) receiving a response for notifying of the permission of the recording of the program corresponding to the program information, from the recording and reproducing device.

33. The method of claim 31, wherein the step (a) comprises the steps of:

(a1) parsing the program guide information from the transport stream;

(a2) displaying the parsed program guide information; and (a3) inputting the program information of the intended program according to the displayed program guide information.

34. The method of claim 33, wherein in the step (a2), the parsed program guide information is displayed on an OSG display.

35. The method of claim 33, wherein in the step (a2), the parsed program guide information is displayed on an OSD display.

36. The method of claim 31, wherein the digital interface of the receiver and the digital interface of the recording/reproducing device are linked by an IEEE 1394 serial bus cable.

37. A method for receiving program information by a receiver with a digital interface for receiving a multi-program transport stream and a reproducing device with a digital interface for reproducing the multi-program transport stream of the program recorded on a recording medium, the method comprising the steps of:

(a) inquiring as to whether to permit the transfer of program information corresponding to the program recorded on the recording medium, during a playback mode;

(b) receiving a response for permitting the reproduction of the program from the reproducing device;

(c) transferring a command for requesting the program information of the program recorded on the recording medium; and (d) receiving the program information of the program recorded on the recording medium from the reproducing device.

38. The method of claim 37, wherein the digital interface of the receiver and the digital interface of the recording/reproducing device are linked by an IEEE 1394 serial bus cable.

* * * * *